US010339421B2

(12) United States Patent
Mei et al.

(10) Patent No.: US 10,339,421 B2
(45) Date of Patent: Jul. 2, 2019

(54) RGB-D SCENE LABELING WITH MULTIMODAL RECURRENT NEURAL NETWORKS

(71) Applicant: Toyota Motor Engineering & Manufacturing North America, Inc., Erlanger, KY (US)

(72) Inventors: Xue Mei, Ann Arbor, MI (US); Danil V. Prokhorov, Canton, MI (US); Haibin Ling, Cherry Hill, NJ (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 133 days.

(21) Appl. No.: 15/474,027

(22) Filed: Mar. 30, 2017

(65) Prior Publication Data

US 2018/0285689 A1    Oct. 4, 2018

(51) Int. Cl.
| | | |
|---|---|---|
| *G06K 9/62* | (2006.01) | |
| *G06N 3/04* | (2006.01) | |
| *G06N 3/08* | (2006.01) | |
| *H04N 7/18* | (2006.01) | |
| *G06T 7/90* | (2017.01) | |

(52) U.S. Cl.
CPC ......... *G06K 9/6256* (2013.01); *G06N 3/0445* (2013.01); *G06N 3/08* (2013.01); *G06T 7/90* (2017.01); *H04N 7/183* (2013.01); *G06T 2207/10024* (2013.01);
(Continued)

(58) Field of Classification Search
CPC  G06N 3/08; G06N 3/02; G06N 3/088; G06K 9/00234; G06K 9/6267
See application file for complete search history.

(56) References Cited

U.S. PATENT DOCUMENTS 9,965,705 B2 *  5/2018  Chen ................... G06N 3/0454
10,013,640 B1 *  7/2018  Angelova .......... G06K 9/00624
(Continued)

FOREIGN PATENT DOCUMENTS

WO    2009058915 A1    7/2009

OTHER PUBLICATIONS

Pinheiro et al., "Recurrent Convolutional Neural Networks for Scene Labeling", Jun. 2013, 9 pages.
(Continued)

*Primary Examiner* — Utpal D Shah
(74) *Attorney, Agent, or Firm* — Christopher G. Darrow; Darrow Mustafa PC

(57) ABSTRACT

Described herein are systems and methods for multimodal recurrent network processing. In an embodiment, a system for evaluating multimodal data comprising a multimodal data input and a multimodal processing module is described. The multimodal data input may comprise the multimodal data, the multimodal data may comprise a first modality and a second modality. The multimodal processing module may be configured to receive the multimodal data comprising the first modality and the second modality; evaluate the first modality using a first recursive neural network comprising a first transformation matrix; evaluate the second modality using a second recursive neural network comprising the first transformation matrix; and determine an output based, at least in part, on evaluating the first modality and the second modality.

21 Claims, 5 Drawing Sheets

(52) U.S. Cl.
CPC ............... *G06T 2207/10028* (2013.01); *G06T 2207/20081* (2013.01); *G06T 2207/30252* (2013.01)

(56) References Cited

U.S. PATENT DOCUMENTS

| | | | |
|---|---|---|---|
| 2017/0098153 A1* | 4/2017 | Mao | G06N 3/0454 |
| 2017/0147910 A1* | 5/2017 | Mao | G06N 3/0454 |
| 2017/0206464 A1* | 7/2017 | Clayton | G06N 99/005 |
| 2018/0268548 A1* | 9/2018 | Lin | G06T 7/11 |

OTHER PUBLICATIONS

Niishida et al., "Multimodal Gesture Recognition using Multi-stream Recurrent Neural Network", Pacific-Rim Symposium on Image and Video Technology, Feb. 2016, 14 pages.

Mao et al., "Deep Captioning With Multimodal Recurrent Neural Networks (M-RNN)", ICLR 2015, 14 pages.

Eitel et al., "Multimodal Deep Learning for Robust RGB-D Object Recognition", Department of Computer Science, University of Freiburg, Germany, 2015, 7 pages.

S. Bell, C. Zitnick, K. Bala and R. Girshick, "Inside-outside net: Detecting objects in context with skip pooling and recurrent neural networks," in Proc. CVPR, 2016.

W. Byeon, T. M. Breuel, F. Raue and M. Liwicki, "Scene labeling with lstm recurrent neural networks," in Proc. CVPR, 2015.

C. Couprie, C. Farabet, Y. LeCun and L. Najman, "Indoor semantic segmentation using depth information," in Proc. ICLR, 2013.

L.C. Chen, G. Papandreou, I. Kokkinos, K. Murphy and A. L. Yuille, "Semantic image segmentation with deep convolutional nets and fully connected crfs," in Proc. ICLR, 2015.

N. Dalal and B. Triggs, "Histograms of oriented gradients for human detection," in Proc. CVPR, 2005.

J. L. Elman, "Finding structure in time," Cognitive Science, vol. 14, No. 2, pp. 179-211, 1990.

C. Farabet, C. Couprie, L. Najman and Y. LeCun, "Learning hierarchical features for scene labeling," TPAMI, vol. 35, No. 8, pp. 1915-1929, 2013.

A. Graves, "Sequence transduction with recurrent neural networks," in Proc. ICML, 2014.

A. Graves, S. Fern'andez and J. Schmidhuber, "Multi-dimensional recurrent neural networks," in Proc. ICANN, 2007.

A. Graves, A.-R. Mohamed and G. Hinton, "Speech recognition with deep recurrent neural networks," in Proc. ICASSP, 2013.

S. Gupta, P. Arbelaez, R. Girshick and J. Malik, "Indoor scene understanding with RGB-D images: Bottom-up segmentation, object detection and semantic segmentation," IJCV, vol. 117, pp. 133-149, 2015.

A. Hermans, G. Floros and B. Leibe, "Dense 3D semantic mapping of indoor scenes from RGB-D images," in Proc. ICRA, 2014.

S. Hong, H. Noh and B. Han, "Decoupled Deep Neural Network for Semi-Supervised Semantic Segmentation," in Proc. NIPS, 2015.

A. E. Johnson and M. Hebert, "Using spin images for efficient object recognition in cluttered 3d scenes.," TPAMI, vol. 21, No. 5, pp. 433-449, 1999.

S.H. Khan, M. Bennamoun, F. Sohel, R. Togneri and I. Naseem, "Integrating geometrical context for semantic labeling indoor scenes using RGBD images," IJCV, vol. 117, pp. 1-20, 2016.

C. Liu, J. Yuen and A. Torralba, "Nonparametric scene parsing: Label transfer via dense scene alignment," in Proc. CVPR, 2009.

D. G. Lowe, "Distinctive image features from scale-invariant keypoints," IJCV, vol. 60, No. 2, 2004.

J. Long, E. Shelhamer and T. Darrell, "Fully convolutional networks for semantic segmentation," in Proc. CVPR, 2015.

Y. LeCun, B. Boser, J. S. Denker, D. Henderson, R. E. Howard, W. Hubbard and L. D. Jackel, "Backpropagation applied to handwritten zip code recognition," Neural Computation, vol. 1, No. 4, pp. 541-551, 1989.

H. Noh, S. Hong and B. Han, "Learning Deconvolution Network for Semantic Segmentation," in Proc. ICCV, 2015.

M. Najafi, S. Namin, M. Salzmann and L. Petersson, "Sample and filter: Nonparametric Scene parsing via efficient filtering," in Proc. CVPR, 2016.

A. Oord, N. Kalchbrenner, K. Kavukcuoglu, "Pixel recurrent neural networks," in Proc. ICML, 2016.

T. Ojala, M. Pietik¨ainen and T. M¨aenp¨a¨a, "Multiresolution gray-scale and rotation invariant texture classification with local binary patterns," TPAMI, vol. 24, No. 7, pp. 971-987, 2002.

D. Pei, H. Liu, Y. Liu and F. Sun, "Unsupervised multimodal feature learning for semantic image segmentation," in Proc. IJCNN, 2013.

X. Ren, L. Bo and D. Fox, "RGB-(D) scene labeling: Features and algorithms," in Proc. CVPR, 2012.

B. Shuai, G. Wang, Z. Zuo, B. Wang and L. Zhao, "Integrating parametric and non-parametric models for scene labeling," in Proc. CVPR, 2015.

B. Shuai, Z. Zuo, B. Wang, and G. Wang, "DAG-Recurrent neural networks for scene labeling," in Proc. CCPR, 2016.

J. Shotton, J. Winn, C. Rother and A. Criminisi, "Textonboost for image understanding: Multi-class object recognition and segmentation by jointly modeling texture, layout, and context," IJCV, vol. 81, No. 1, 2009.

K. Simonyan and A. Zisserman, "Very deep convolutional networks for large-scale image recognition," in Proc. ICLR, 2015.

N. Silberman and R. Fergus, "Indoor Scene Segmentation using a Structured Light Sensor," in Proc. ICCV Workshop, 2011.

N. Silberman, P. Kohli, D. Hoiem and R. Fergus, "Indoor segmentation and support inference from RGBD images," in Proc. ECCV, 2012.

S. Song, S. Lichtenberg and J. Xiao, "SUN RGB-D: A RGB-D scene understanding benchmark suite," in Proc. CVPR, 2015.

J. Tighe and S. Lazebnik, "Superparsing: scalable nonparametric image parsing with superpixels," in Proc. ECCV, 2010.

A. Vedaldi and K. Lenc, "MatConvNet—Convolutional Neural Networks for MATLAB," in Proc. ACM MM, 2015.

A. Wang, J. Lu, J. Cai, G. Wang and T.-J. Cham, "Unsupervised joint feature learning and encoding for RGB-D scene labeling," TIP, vol. 24, No. 11, pp. 4459-4473, 2015.

D. Wolf, J. Prankl and M. Vincze, "Fast semantic Segmentation of 3D point clouds using a dense CRF with learned parameters," in Proc. ICRA, 2015.

W. Wang, Z. Cui, Y. Yan, J. Feng, S. Yan, X. Shu and N. Sebe, "Recurrent face aging," in Proc. CVPR, 2016.

J. Yang, B. Price, S. Cohen and M.-H. Yang, "Context driven scene parsing with attention to rare classes," in Proc. CVPR, 2014.

Z. Zuo, B. Shuai, G. Wang, X. Liu, X. Wang and B. Wang, Learning contextual dependencies with convolutional hierarchical recurrent.

* cited by examiner

RGB-D SCENE LABELING WITH MULTIMODAL RECURRENT NEURAL NETWORKS

TECHNICAL FIELD

The subject matter described herein relates in general to RGB-D scene labeling, and more particularly, to RGB-D scene labeling with multimodal recurrent neural networks.

BACKGROUND

Computer vision plays a crucial role in robotics for analyzing and understanding surrounding environments. As one of the most challenging problems in computer vision, image labeling, which aims to assign a pre-defined semantic label to each pixel in an image, is a key step to understand an image. Several techniques attempt to predict an image label for a scene. Recurrent neural networks (RNNs) are frequently used to predict image labels for a scene. However, RNNs only deal with one modality of an image and are therefore less effective in predicting scene labels for multimodal images, e.g., RGB-D scenes.

SUMMARY

This disclosure describes various embodiments for processing multimodal recurrent neural networks. In an embodiment, a system for evaluating multimodal data comprising a multimodal data input and a multimodal processing module is described. The multimodal data input may comprise the multimodal data, the multimodal data may comprise a first modality and a second modality. The multimodal processing module may be configured to receive the multimodal data comprising the first modality and the second modality; evaluate the first modality using a first recursive neural network comprising a first transformation matrix; evaluate the second modality using a second recursive neural network comprising the first transformation matrix; and determine an output based, at least in part, on evaluating the first modality and the second modality.

In an embodiment, an automobile comprising an RGB-D camera and an image processing module is described. The RGB-D camera may be configured to capture an RGB-D image; and output a RGB modality and a depth modality. The image processing module may be in communication with the RGB-D camera. The image processing module may be configured to receive the RGB modality and the depth modality; evaluate the RGB modality using a first recursive neural network comprising a first transformation matrix; evaluate the depth modality using a second recursive neural network comprising the first transformation matrix; and determine a prediction comprising predictions of objects in the RGB-D image.

In an embodiment, a method for evaluating multimodal data is described. The method may comprise receiving the multimodal data comprising a first modality and a second modality; evaluating the first modality using a first recursive neural network comprising a first transformation matrix; evaluating the second modality using a second recursive neural network comprising the first transformation matrix; and determining an output based, at least in part, on evaluating the first modality and the second modality.

DETAILED DESCRIPTION

Described herein are systems and method for processing multimodal recurrent neural networks (MM-RNNs). MM-RNNs may share memory across multiple modalities. By sharing memory, each modality may not only possess its own property but may also possess the attributes of other modalities, and thus becomes more discriminative to distinguish pixels and more accurate predict scene labels. Sharing memory may be accomplished by using one or more common transformation matrices across multiple modalities.

Figure 1:
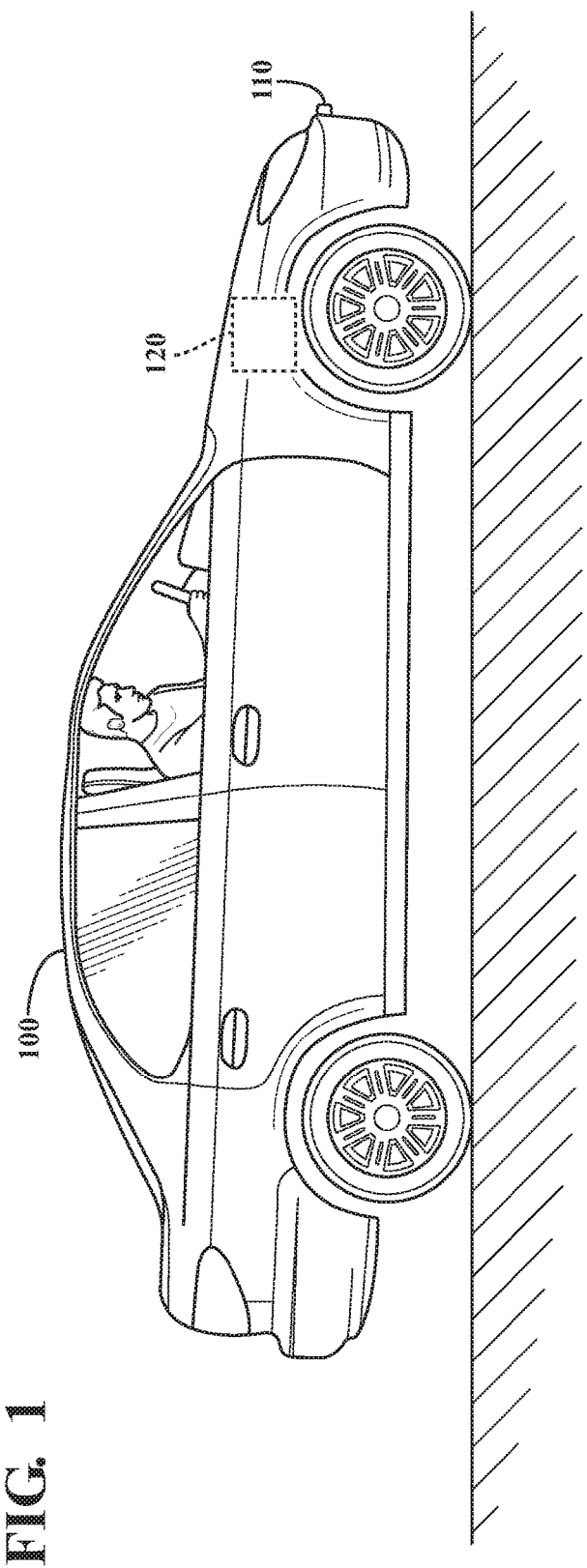
FIG. 1 is a diagram of an embodiment of a vehicle comprising a RGB-D camera.

FIG. 1 is a diagram of an embodiment of a vehicle 100 comprising a RGB-D camera 110. RGB-D camera 110 may be configured to capture two images simultaneously. The two images may be an RGB image and a depth image. The depth image may be created by capturing an image of a scene and then comparing each pixel of the scene to previously stored pixel values that correlate to different depths. By comparing to the previously stored pixel values, a determination may be made as to the depth of objects in the scene. Depth may be used to determine size and shape of an object. The RGB image may be captured using an RGB image capture technology. The data related to the two images may be combined resulting in a RGB-D image that associates a depth with each pixel of an RGB image.

The images captured by the RGB-D camera 110 may be processed by an image processing module 120. The image processing module 120 may be a standalone module in vehicle 100 or may be part of an electronic control unit (ECU) within the vehicle 100. In other embodiments, the image processing module 120 may part of camera 110. In some embodiments, the camera 110 may be a standalone camera, e.g., a handheld camera or tripod mounted camera, or may be installed on other types of vehicles, e.g., a truck or aerial vehicle. In some embodiments, the image processing module 120 may be a part of the camera or some other image processing device.

Images captured using an RGB-D camera may be processed using recurrent neural networks (RNN). RNNs may be used for processing sequential data tasks. An RNN may be an artificial neural network where connections exist between various units of the network. Each unit may have a directed connection to neighboring units. Each unit may have a time-varying real-valued activation. Each connection may have a modifiable real-valued weight. Some of the units are called input nodes, some output nodes, the rest hidden nodes. The nodes may make up a layer.

Each of the units may use its memory to maintain information about a previous input. The use of memory may be beneficial in processing sequential data, e.g., an image with a sequence of pixels. Specifically, a hidden layer $h_t$ in an RNN at time step t may be represented with a non-linear function over current input $x_t$ and the hidden layer at previous time step $h_{t-1}$. The output layer $y_t$ may be connected to hidden layer $h_t$. Given an input sequence $\{x_t\}_{t=1, 2 \ldots T}$, the hidden and output layers at time step t may be obtained through:

$$h_t = \varnothing(Ux_t + Wh_{t-1} + b_h)$$

$$y_t = \sigma(Vh_t + b_y)$$

where U, W, and V denote shared transformation matrices $b_h$ and $b_y$ are two bias terms, and $\varnothing(.)$ and $\sigma(.)$ and are non-linear functions.

Because the inputs are progressively stored in hidden layers, the RNN may keep 'memory' of the whole sequence and may model long-range dependencies among the sequence. The matrices W and V play crucial roles. The W may be responsible for storing 'memory' of whole sequence and the V may be used to transform this memory to output layer.

In some RGB-D processing models, each stream, e.g., RGB and D, is processed using a single-modal RNN as described above. In some cases, the inputs to the RNNs may be concatenated into a single input prior to processing as follows:

$$x_t = \text{cat}(x_t^1, x_t^2, \ldots x_t^m)$$

$$h_t = \varnothing(Ux_t + Wh_{t-1} + b_h)$$

$$y_t = \sigma(Vh_t + b_y)$$

where $x^m_t$ denotes input of the $m^{th}$ modality, M is the number of modalities (in the case of RGB-D processing, M=2), and cat represents a concatenation operation.

In this case, multimodal properties of different inputs may be ignored and the model may not have any explicit mechanism to model the correlation across modalities.

In other cases, each modality may be treated completely independent. Namely, multiple RNNs may be utilized in parallel for each modality and the final output may be derived by fusing the outputs of all modalities as follows:

$$h_t^m = \varnothing(U^m x_t^m + W^m h_{t-1}^m + b_h^m)$$

$$y_t^m = \sigma(V^m h_t^m + b_y^m)$$

$$o_t = \sum_{m=1}^{M} w^m y_t^m$$

where $x^m_t$, $h^m_t$, and $y^m_t$ denote the input, hidden layer and output layer of the $m^{th}$ modality respectively. The $U^m$, $W^m$ and $V^m$ represent the shared transformation matrices of the $m^{th}$ modality, $b^m_h$ and $b^m_y$ are bias terms of the $m^{th}$ modality, $w^m$ denotes the weight of the $m^{th}$ modality, and $o_t$ is the final output via weighted summation over output layers of all modalities.

In this case, information may be explicitly stored for each modality. However, the interaction across modalities may not be taken into account. Therefore, the cross-modality correlation may not be incorporated into the learning process.

In each of these cases, memory is not shared between the RNNs, thus ignoring the correlation between modalities. When the memory is not shared between RNNs, the results may be less reliable.

Figure 2:
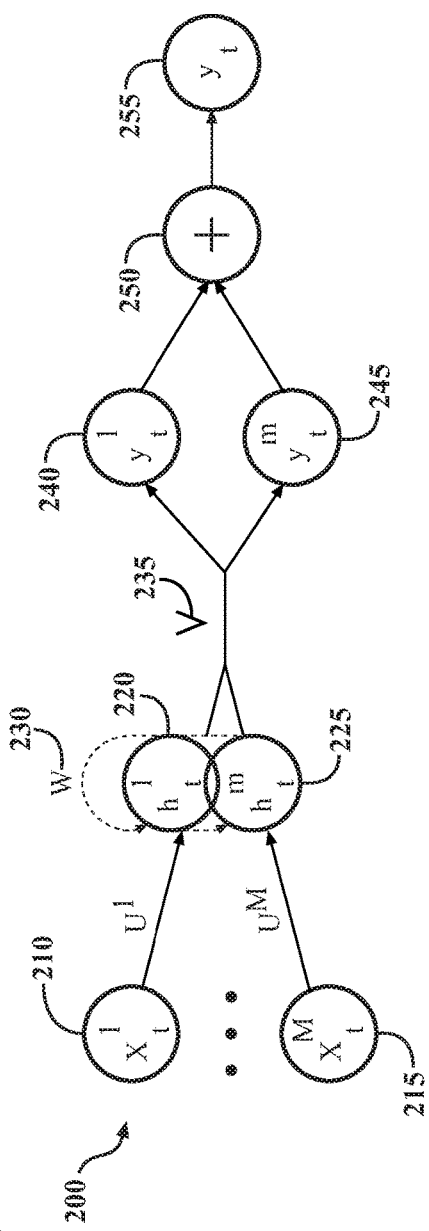
FIG. 2 is a diagram of an embodiment of a multimodal recurrent network process where memory is shared between multiple RNNs.

FIG. 2 is a diagram of an embodiment of a multimodal recurrent neural network (MM-RNN) process 200 where memory is shared between multiple RNNs. The process may be implemented by image processing module 120 or some other multimodal recurrent network processing module. The process may be referred to as multimodal recurrent neural networks or MM-RNN. MM-RNNs may explicitly model long-range dependencies both within the same modality and across multiple modalities. MM-RNNs may share weights, which are capable of capturing memory across modalities. Multiple parallel RNNs may be used to learn each modality respectively. However, the transformation matrices W and V may be shared across all RNNs. In this way, the memory of each modality may be shared by all other modalities, and the inter-correlation among modalities may be encoded into the learning process. This process may be mathematically expressed with:

$$h_t^m = \varnothing(U^m x_t^m + Wh_{t-1}^m + b_h^m)$$

$$y_t^m = \sigma(Vh_t^m + b_y^m)$$

$$o_t = \sum_{m=1}^{M} w^m y_t^m$$

where W and V are transformation matrices shared across modalities. For $U^m$ of each modality, it is not responsible for storing any memory and thus not shared across modalities. Where m represents the current modality, where m can be any integer value from 1 to many. MM-RNNs may be used to process any number modalities. All of the modalities of the MM-RNN may use the shared transformation matrices W and V.

As shown in FIG. 2, inputs 210 and 215 each have a corresponding U. Hidden layers 220 and 225 share a common W 230 and V 235. Outputs 240 and 245 for each modality may be concatenated at 250 resulting in a final output 255.

Figure 3:
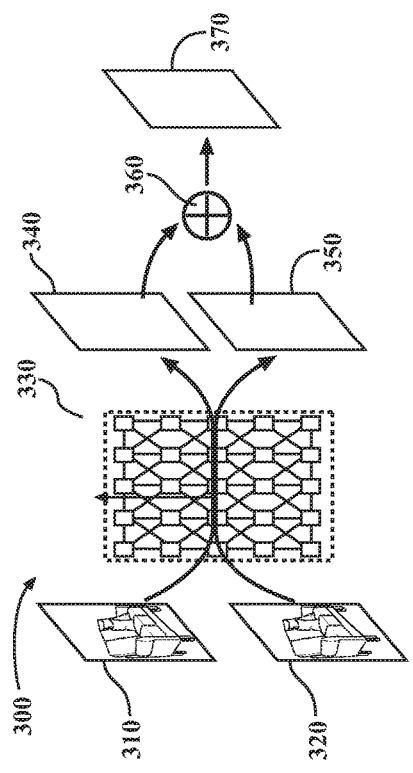
FIG. 3 is a diagram of an embodiment of MM-RNN for RGB-D prediction.

FIG. 3 is a diagram of an embodiment of MM-RNN for RGB-D prediction 300. A RGB image 310 and a depth image 320 may be received as inputs. Shared memory processing occurs at MM-RNN 330. Shared memory processing by MM-RNN 330 may share memory between the two modalities. The shared memory may result in an increased pixel discrimination for classification. An RGB prediction is received at 340 and a depth prediction is received at 350. The RGB prediction 340 and depth prediction 350 may be combined at summation 360 and a final prediction 370 may be output.

Figure 4:
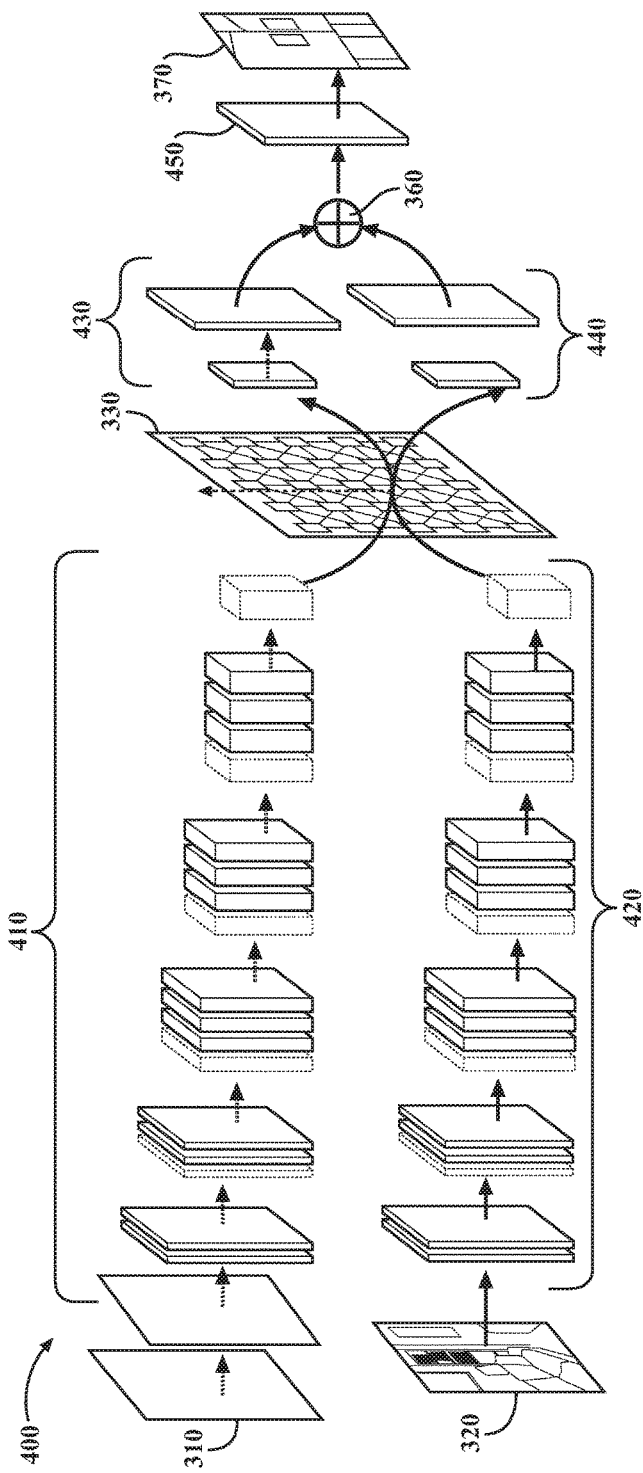
FIG. 4 is a diagram of an embodiment of an RGB-D prediction system.

FIG. 4 is a diagram of an embodiment of a RGB-D prediction system. A RGB image 310 and a depth image 320 may be received as inputs. The RGB image 310 may be preprocessed using a convolutional neural network (CNN) during phase 410. The depth image 320 may be processed using a CNN during phase 410. Additionally, the depth image may be replaced with an HHA image before processing by the CNN. An HHA image may comprise three channels representing horizontal disparity, height above ground, and angle with gravity. The CNNs may be used to extract deep features of the RGB image 310 and depth image 320. The output of the CNNs may be input to MM-RNN 330 for shared memory processing. MM-RNN 330 may output RGB feature map 430 and depth feature map 440. RGB feature map 430 and depth feature map 440 may each possess properties of the other based upon the shared memory. RGB feature map 430 and depth feature map 440 may be up-sampled to return to the size of RGB image 310 and depth image 320. After up-sampling, the RGB feature map 430 and depth feature map 440 may be combined by summation 360. A prediction label 450 may be applied and then the final prediction 370 may be output.

Figure 5A:
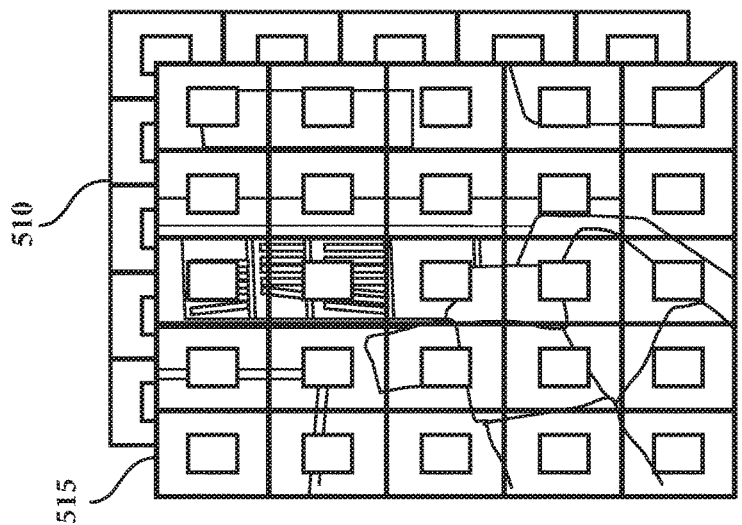
FIG. 5A is a diagram of an embodiment of RGB-D inputs for MM-RNN processing.
Figure 5B:
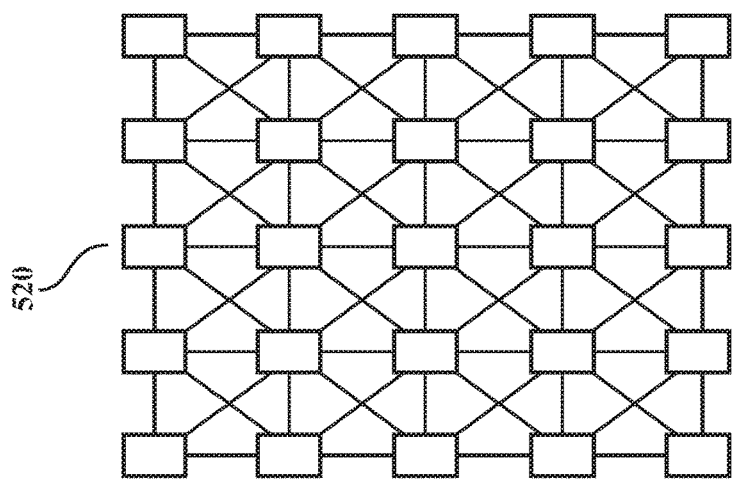
FIG. 5B is a diagram of an embodiment of a graph of loopy interactions between the units in a modality of an RGB-D image.

FIG. 5A-5F depict embodiments of an application of MM-RNNs to graphical processing. FIG. 5A is a diagram of an embodiment of RGB-D inputs for MM-RNN processing. RGB modality 515 and depth modality 510 may be received from an RGB-D camera or other imaging device. RGB modality 515 and depth modality 510 may be segmented into units indicated by the rectangles within each region of the modality. The units may be a single pixel or a grouping of pixels. FIG. 5B is a diagram of an embodiment of a graph 520 of loopy interactions between the units in a modality of an RGB-D image. The units may be indicated by the rectangles and the interactions may be indicated by the lines connecting each of the units. In this case, the interactions may be in an undirected cyclic graph. The loopy nature of graph 520 may not be suitable to process an image. In an embodiment, the undirected cyclic graph may be approximated using one or more directed acyclic graphs. For example, four acyclic graphs may be selected and processed in different directions, e.g., southeast, southwest, northeast, and northwest.

Figure 5C:
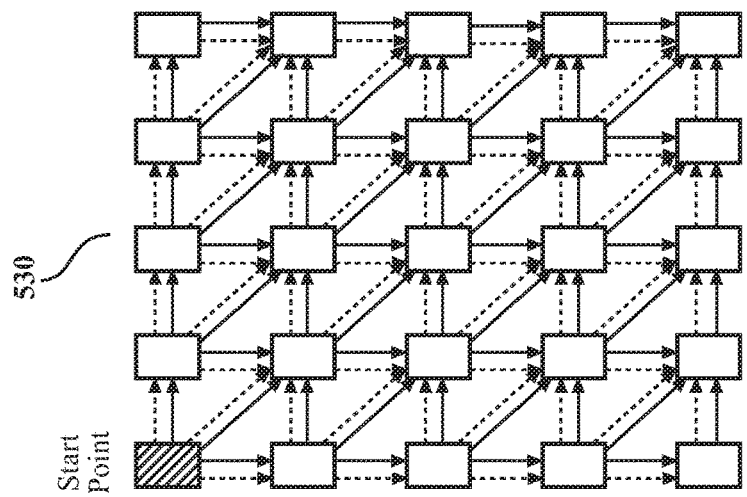
FIG. 5C is a diagram of an acyclic graph for directed southeast processing.
Figure 5F:
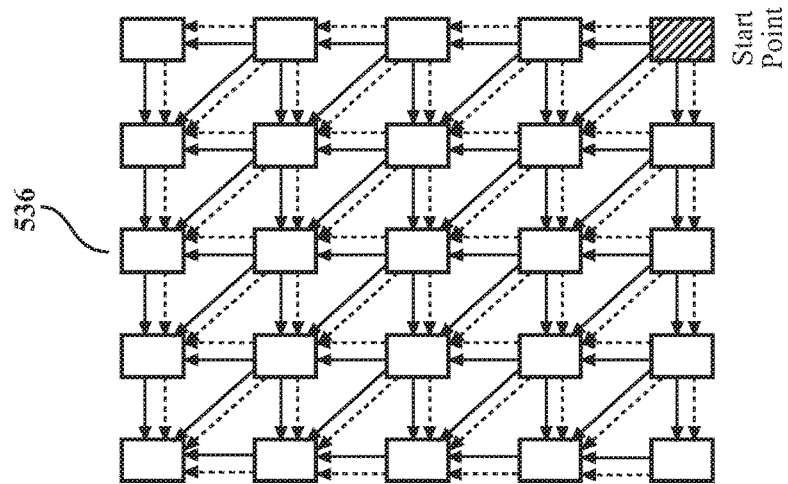
FIG. 5F is a diagram of an acyclic graph for directed northwest processing.
Figure 5E:
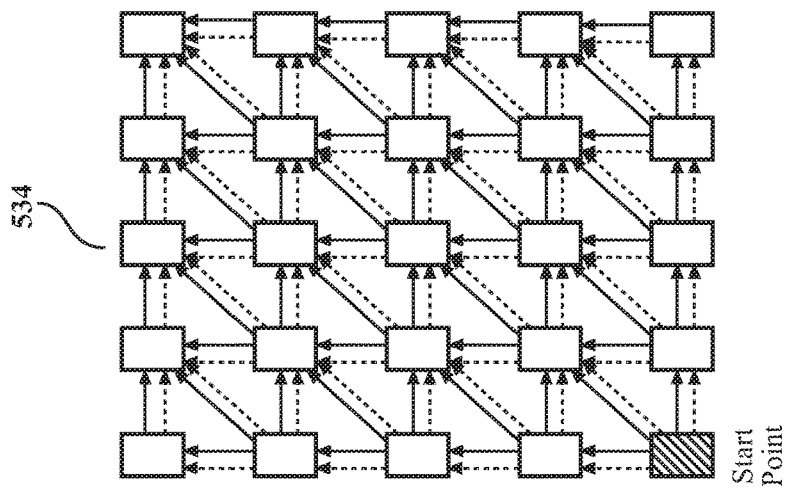
FIG. 5E is a diagram of an acyclic graph for directed northeast processing.
Figure 5D:
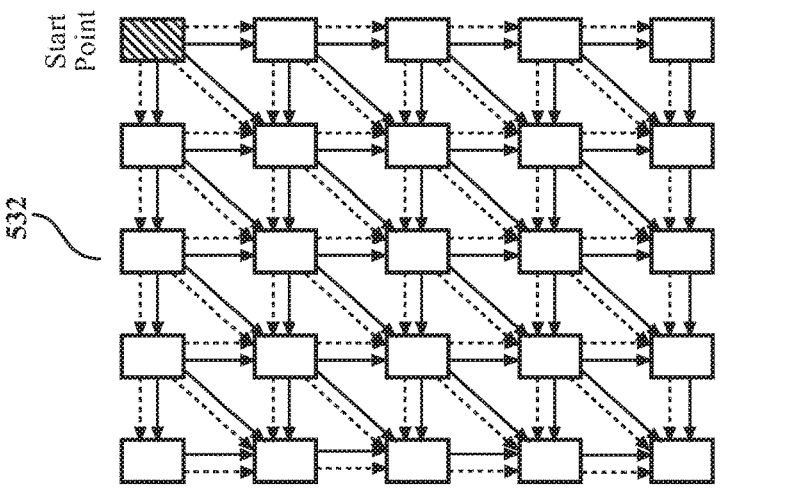
FIG. 5D is a diagram of an acyclic graph for directed southwest processing.

FIG. 5C is a diagram of an acyclic graph 530 for directed southeast processing. Processing may begin at the hashed node labeled with start point at the northwesternmost unit. Using the memory sharing of the MM-RNN, each unit may process RGB modality 515 and depth modality 510 as shown by the lines connecting each unit. The dashed lines may represent the RGB modality 515 and the solid lines may represent the depth modality 510. Processing may proceed from the northwesternmost unit to the southeasternmost unit. FIG. 5D is a diagram of an acyclic graph 532 for directed southwest processing. Processing may begin at the hashed node labeled with start point at the northeasternmost unit. Processing may proceed from the northeasternmost unit to the southwesternmost unit. FIG. 5E is a diagram of an acyclic graph 534 for directed northeast processing. Processing may begin at the hashed node labeled with start point at the southwesternmost unit. Processing may proceed from the southwesternmost unit to the norteasternmost unit. FIG. 5F is a diagram of an acyclic graph 536 for directed northwest processing. Processing may begin at the hashed node labeled with start point at the southeasternmost unit. Processing may proceed from the southeasternmost unit to the nortwesternmost unit.

The directed acyclic processing may be represented mathematically according to the following equations. Let $\zeta=\{V, \varepsilon\}$ represent the directed acyclic graph, where $V=\{v_i\}_{i=1,2,\ldots,N}$ is a vertex set and $\varepsilon=\{e_{ij}\}$ denotes the edge set in which $e_{ij}$ represents a directed edge from vertex $v_i$ to $v_j$. The structure of MM-RNNs may follow the same topology as $\zeta$. A forward pass may be seen as traversing $\zeta$ from a start point, and each vertex may depend on all its predecessors. For vertex $v_i$, its hidden layer $h^m_{vi}$ for modality m is expressed as a non-linear function over current input $x^m_{vi}$ of modality m and summation of hidden layer and of all its predecessors of the $m^{th}$ modality. Specifically, the hidden layer $h^m_{vi}$, output layer $y^m_{vi}$ and final output $o_{vi}$ at vertex $v_i$ may be calculated by:

$$h^m_{vi} = \phi\left(U^m x^m_{tvi} + W \sum_{vj \in P_\zeta(vi)} h^m_{vj} + b^m_h\right)$$

$$y^m_{vi} = \sigma(V h^m_{vi} + b^m_y)$$

$$o_{vi} = \sum_{m=1}^{M} w^m y^m_{vi}$$

where $P_{\zeta(vi)}$ represents the predecessor set of $v_i$ in $\zeta$. The matrices W may be capable of storing 'memory' across modalities, V is able to transform this memory to output and the final output at V' may be derived via weighted summation over the outputs of all modalities.

The derivatives may be calculated in the back propagation, and each vertex may be processed in the reverse order of forward pass sequence. Specifically, to compute the derivatives at vertex $v_i$, we need to look at the forward passes of its successors. Let $S_{\zeta(vi)}$ represent the direct successor set for $v_i$ in $\zeta$. For each vertex $v_k \in S_{\zeta(vi)}$, its hidden layer at modality m may be computed through:

$$h^m_{vk} = \phi\left(U^m x^m_{vk} + W h^m_{vi} + W \sum_{v \in iP_{\zeta(vk)}-\{vi\}} h^m_{vi} + b^m_h\right)$$

In this case, errors that are back-propagated to the hidden layer $v_i$ for the $m^{th}$ modality may come from two sources: direct errors from $v_i$ and summation over indirect errors from all its successors $v_k \in S_{\zeta(vi)}$. Based on the foregoing, derivatives at vertex $v_i$ for the $m^{th}$ modality may be computed as:

$$dh^m_{vi} = v^T \sigma'(y^m_{vi}) + \sum_{vk \in S_\zeta(vi)} w^T dh^m_{vk} \circ \phi'(h^m_{vk})$$

$$\nabla W^m_{vi} = \sum_{vk \in S_\zeta(vi)} dh^m_{vk} \circ \phi'(h^m_{vk})(h^m_{vi})^T$$

$$\nabla U^m_{vi} = dh^m_{vk} \circ \phi'(h^m_{vk})(x^m_{vi})^T$$

$$\nabla V^m_{vi} = \sigma'(y^m_{vi})(h^m_{vi})^T$$

$$\nabla b^m_h = dh^m_{vi} \circ \phi'(h^m_{vi})$$

$$\nabla b^m_y = \sigma'(y^m_{vi})$$

where $\circ$ is the Hadamard product, $$\sigma'(.) = \frac{\partial L}{\partial^\circ(.)} \frac{\partial^\circ(.)}{\partial y(.)} \frac{\partial y(.)}{\partial \sigma}$$

denotes the derivative of loss function with respect to function $\sigma$, $$\phi'(.) = \frac{\partial h}{\partial \phi},$$

and superscript T is a transportation operation. The average cross entropy loss function may be used to compute L. For W and V which may be shared across modalities, their derivatives at vertex $v_i$ may be calculated as:

$$\nabla W_{vi} = \sum_{m=1}^{M} \nabla W_{vi}^m, \nabla V_{vi} = \sum_{m=1}^{M} \nabla V_{vi}^m$$

As described previously herein, an undirected cyclic graph may be decomposed into four directed acyclic graphs. Let $\zeta^U = \{\zeta_1, \zeta_2, \zeta_3, \zeta_4\}$ represent the undirected acyclic graph, where $\zeta_1, \zeta_2, \zeta_3, \zeta_4$ are four directed acyclic graphs. For each $\zeta_d$ (d=1, 2, . . . , 4), we may obtain a corresponding hidden layer for the $m^{th}$ modality using:

$$h_{vi,d}^m = \phi\left(U_d^m x_{vi}^m + W_d \sum_{vj \in P\zeta d} h_{vj,d}^m + b_{h,d}^m\right)$$

$$y_{vi}^m = \sigma\left(\sum_{\zeta d \in \zeta^U} V h_{vi}^m + b_y^m\right)$$

$$o_{vi} = \sum_{m=1}^{M} w^m y_{vi}^m$$

where $h_{vi,d}^m$ denotes the hidden layer of the $m^{th}$ modality at vertex $v_i$ in directed acyclic graph $\zeta_d$, $U_d^m$ represents transformation matrix between input layer and hidden layer for modality m in $\zeta_d$, $W_d$ and $V_d$ may be shared transformation matrices between the previous hidden layer and the current hidden layer, hidden layer and output layer in $\zeta_d$, $y_{vi}^m$ is the output layer for modality m, $b_{h,d}^m$ and $b_y^m$ may be bias terms, and $o_{vi}$ may be the final output at vertex $v_i$.

Loss L may be calculated as:

$$L = -\frac{1}{N} \sum_{vi \in \zeta^U} \sum_{c=1}^{C} \log(o_{vi}^c Y_{vi}^c)$$

where N may represent the number of image units, C may be the number of semantic classes, $o_{vi}$ may be class likelihood vector, and $Y_{vi}$ may denote the binary label indicator vector for an image unit at $v_i$.

The error back-propagated from an MM-RNN to the convolutional layer at $v_i$ for modality m may be computed with:

$$\nabla x_{vi}^m = \sum_{\zeta d \in \zeta^U} (U_d^m)^T dh_{vi,d}^m \circ \phi'(h_{vi,d}^m)$$

The foregoing MM-RNN forward and backward propagations using shared memory may be used in any RNN system with more than one modality, e.g., an RGB-D system with two modalities or some other system with more than two modalities. An MM-RNN module, e.g., image processing module 120, may receive a multimodal data input, e.g., an RGB-D data feed, and make predictions using an MM-RNN processing as described herein. The MM-RNN module may be used with an RGB-D system to predict what objects are captured in the image. For example, the MM-RNN modules may process a captured RGB-D image and determine the presence of traffic control devices, vehicles, pedestrians, etc.

In an example implementation meant to be illustrative and not limiting, the system may use the architecture and parameters from the visual geometry group 16 network before the 5th pooling layer of CNN processing. The system may further us a non-linear activation function $\emptyset = \max(0, x)$ and $\sigma$ may be a softmax function. Function $\sigma$ may be applied after upsampling the layers, and $$L = -\frac{1}{N} \sum_{vi \in \zeta^U} \sum_{c=1}^{C} \log(o_{vi}^c Y_{vi}^c)$$

may be utilized to calculate the loss between prediction and ground truth. The upsampling factor may be set to 2. Namely, the ground truth maps subsampled during training stage, while the final label prediction maps may be further upsampled to original input size by simple bilinear interpolation. The full network may be trained by stochastic gradient descent (SGD) with momentum. The learning rate may be initialized to be $10^{-3}$ and may decay exponentially with the rate of 0.9 after 10 epochs. The results may be reported after 35 epochs.

Figure 6:
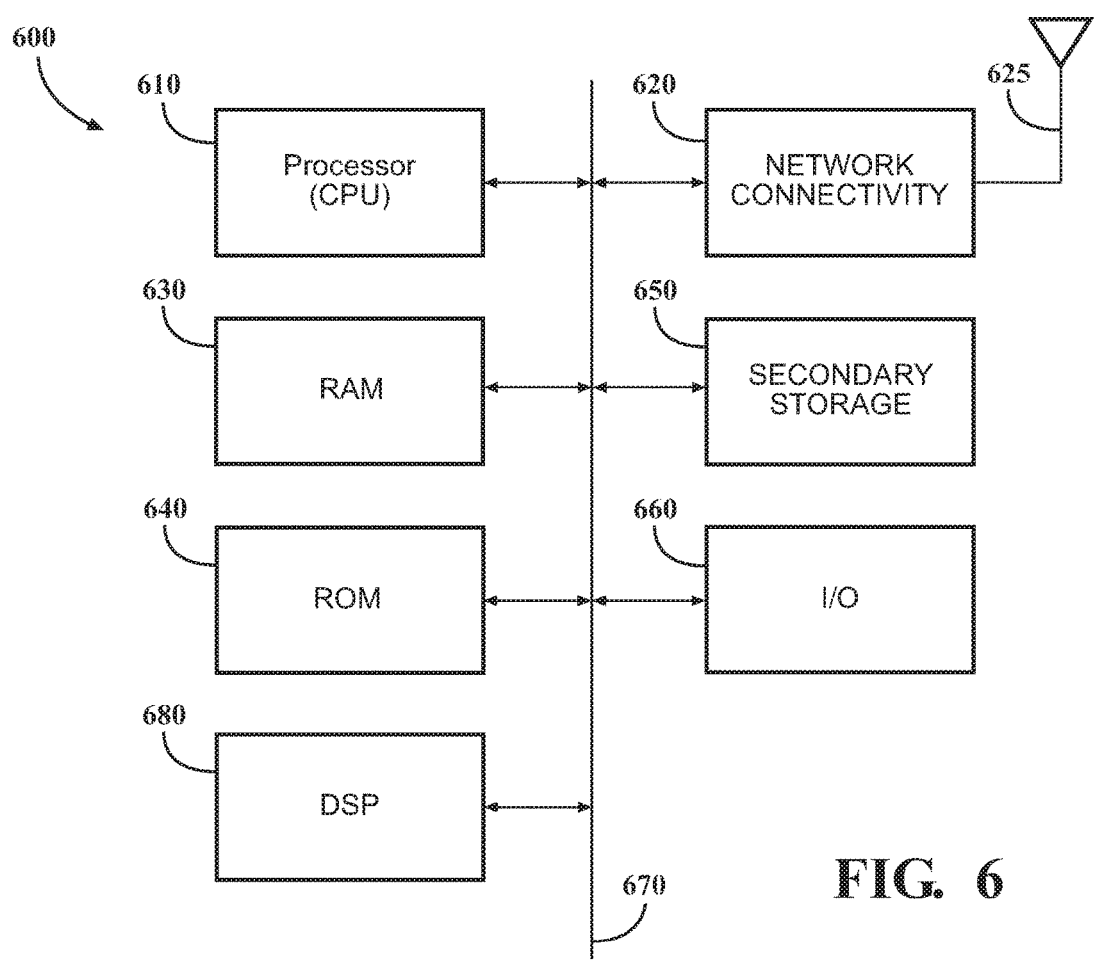
FIG. 6 is a diagram of an embodiment of a system for implementing an MM-RNN processing module.

FIG. 6 is a diagram of an embodiment of a system 600 that includes a processor 610 suitable for implementing one or more embodiments disclosed herein, e.g., an image processor 120 with a MM-RNN processing capability. In other embodiments, the MM-RNN processing capability may be found in other modules used in predicting or learning other types of data. The processor 610 may control the overall operation of the system.

In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips and may be a hardware device capable of executing computer instructions.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN), domestic digital bus (D2B), and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

It will be understood by one having ordinary skill in the art that construction of the described invention and other components is not limited to any specific material. Other exemplary embodiments of the invention disclosed herein may be formed from a wide variety of materials, unless described otherwise herein.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A system for evaluating multimodal data comprising:
  a multimodal data input comprising the multimodal data, the multimodal data comprising a first modality and a second modality; and
  a multimodal processing module configured to:
    receive the multimodal data comprising the first modality and the second modality;

evaluate the first modality using a first recursive neural network comprising a first transformation matrix;
evaluate the second modality using a second recursive neural network comprising the first transformation matrix, wherein the first transformation matrix shares memory of the first modality and the second modality between the first recursive network and the second recursive network to inform the first recursive network and the second recursive network of inter-correlations between the first modality and the second modality; and
determine an output based, at least in part, on evaluating the first modality and the second modality.

2. The system of claim 1, wherein the first recursive neural network comprises a first hidden layer and the second recursive neural network comprises a second hidden layer, and wherein the multimodal processing module is further configured to:
evaluate the first hidden layer using the first transformation matrix; and
evaluate the second hidden layer using the first transformation matrix, wherein the first transformation matrix shares learned weights between the first recursive neural network and the second recursive neural network.

3. The system of claim 2, wherein the first recursive neural network comprises a first output layer and the second recursive neural network comprises a second output layer, and wherein the multimodal processing module is further configured to determine the first output layer and the second output layer using a second transformation matrix that shares learned weights of the first output layer and the second output layer to provide memory of cross-correlations between the first modality and the second modality.

4. The system of claim 3, wherein the multimodal processing module is further configured to determine the output based, at least in part, upon a summation of the first output layer and the second output layer.

5. The system of claim 4, wherein the multimodal processing module is further configured to evaluate the multimodal data based, at least in part, on an equation set, as follows:

$$h_t^m = \phi(U^m x_t^m + W h_{t-1}^m + b_h^m)$$
$$y_t^m = \sigma(V h_t^m + b_y^m)$$
$$o_t = \sum_{m=1}^{M} w^m y_t^m$$

wherein W represents the first transformation matrix and V represents the second transformation matrix across the first modality and the second modality, wherein $h_t^m$ represents a hidden layer and $y_t^m$ represents an output layer for a respective modality, and wherein $o_t$ represents a final output via weighted summation for the first modality and the second modality.

6. The system of claim 1, wherein the multimodal data input comprises an RGB-D image, and wherein the first modality comprises an RGB image and the second modality comprises a depth image.

7. The system of claim 1, wherein the multimodal processing module is configured to implement hidden layers of the first recursive neural network and the second recursive neural network using directed acyclic graphs that define the hidden layers at separate vertices with the first transformation matrix and a second transformation matrix sharing memory of the first modality and the second modality between corresponding ones of the vertices of the first recursive neural network and the second recursive neural network.

8. An automobile comprising:
a RGB-D camera configured to:
capture a RGB-D image; and
output a RGB modality and a depth modality; and
an image processing module in communication with the RGB-D camera, the image processing module configured to:
receive the RGB modality and the depth modality;
evaluate the RGB modality using a first recursive neural network comprising a first transformation matrix;
evaluate the depth modality using a second recursive neural network comprising the first transformation matrix, wherein the first transformation matrix shares memory of the first modality and the second modality between the first recursive network and the second recursive network to inform the first recursive network and the second recursive network of inter-correlations between the first modality and the second modality; and
determine a prediction comprising predictions of objects in the RGB-D image.

9. The automobile of claim 8, wherein the first recursive neural network comprises a first hidden layer and the second recursive neural network comprises a second hidden layer, and wherein the image processing module is further configured to:
evaluate the first hidden layer using the first transformation matrix; and
evaluate the second hidden layer using the first transformation matrix, wherein the first transformation matrix shares learned weights between the first recursive neural network and the second recursive neural network.

10. The automobile of claim 9, wherein the first recursive neural network comprises a first output layer and the second recursive neural network comprises a second output layer, and wherein the image processing module is further configured to determine the first output layer and the second output layer using a second transformation matrix that shares learned weights of the first output layer and the second output layer to provide memory of cross-correlations between the RGB modality and the depth modality.

11. The automobile of claim 10, wherein the image processing module is further configured to determine the prediction based, at least in part, upon a summation of the first output layer and the second output layer.

12. The automobile of claim 11, wherein the image processing module is further configured to evaluate the RGB-D image based, at least in part, on an equation set, as follows:

$$h_t^m = \phi(U^m x_t^m + W h_{t-1}^m + b_h^m)$$
$$y_t^m = \sigma(V h_t^m + b_y^m)$$
$$o_t = \sum_{m=1}^{M} w^m y_t^m$$

wherein W represents the first transformation matrix and V represents the second transformation matrix across the first modality and the second modality, wherein $h^m_t$ represents a hidden layer and $y^m_t$ represents an output layer for a respective modality, and wherein $o_t$ represents a final output via weighted summation for the RGB modality and the depth modality.

13. The automobile of claim 8, wherein the image processing module is further configured to implement hidden layers of the first recursive neural network and the second recursive neural network using directed acyclic graphs that define the hidden layers at separate vertices with the first transformation matrix and a second transformation matrix sharing memory of the RGB modality and the depth modality between corresponding ones of the vertices of the first recursive neural network and the second recursive neural network.

14. A method for evaluating multimodal data, the method comprising:
receiving the multimodal data comprising a first modality and a second modality;
evaluating the first modality using a first recursive neural network comprising a first transformation matrix;
evaluating the second modality using a second recursive neural network comprising the first transformation matrix, wherein the first transformation matrix shares memory of the first modality and the second modality between the first recursive network and the second recursive network to inform the first recursive network and the second recursive network of inter-correlations between the first modality and the second modality; and
determining an output based, at least in part, on evaluating the first modality and the second modality.

15. The method of claim 14, further comprising:
evaluating a first hidden layer of the first recursive neural network using the first transformation matrix; and
evaluating a second hidden layer of the second recursive neural network using the first transformation matrix, wherein the first transformation matrix shares learned weights between the first recursive neural network and the second recursive neural network.

16. The method of claim 15, further comprising determining a first output layer of the first recursive neural network and a second output layer of the second recursive neural network using a second transformation matrix that shares learned weights of the first output layer and the second output layer to provide memory of cross-correlations between the first modality and the second modality.

17. The method of claim 16, further comprising determining the output based, at least in part, upon a summation of the first output layer and the second output layer.

18. The method of claim 17, wherein evaluating the first modality and evaluating the second modality is based, at least in part, on an equation set, as follows:

$$h^m_t = \phi(U^m x^m_t + W h^m_{t-1} + b^m_h)$$
$$y^m_t = \sigma(V h^m_t + b^m_y)$$
$$o_t = \sum_{m=1}^{M} w^m y^m_t$$

wherein W represents the first transformation matrix and V represents the second transformation matrix across the first modality and the second modality, wherein $h^m_t$ represents a hidden layer and $y^m_t$ represents an output layer for a respective modality, and wherein $o_t$ represents a final output via weighted summation for the first modality and the second modality.

19. The method of claim 14, wherein the multimodal data comprises an RGB-D image, and wherein the first modality comprises an RGB image and the second modality comprises a depth image.

20. The method of claim 14, further comprising implementing hidden layers of the first recursive neural network and the second recursive neural network using directed acyclic graphs that define the hidden layers at separate vertices with the first transformation matrix and a second transformation matrix sharing memory of the first modality and the second modality between corresponding ones of the vertices of the first recursive neural network and the second recursive neural network.

21. The method of claim 14, wherein the multimodal data further comprises a plurality of additional modalities, the method further comprising:
evaluating each of the plurality of additional modalities using a plurality of additional recursive neural networks each of the plurality of additional recursive neural networks comprising the first transformation matrix.

* * * * *